No. 806,261. PATENTED DEC. 5, 1905.
J. R. JONES.
WHEELED PLOW.
APPLICATION FILED MAR. 20, 1905.

Witnesses:
I. Sovereign
E. Behel

Inventor:
Judson R. Jones
By A. O. Behel
Atty.

UNITED STATES PATENT OFFICE.

JUDSON R. JONES, OF ROCKTON, ILLINOIS, ASSIGNOR TO J. THOMPSON & SONS MANUFACTURING COMPANY, OF BELOIT, WISCONSIN, A CORPORATION OF WISCONSIN.

WHEELED PLOW.

No. 806,261.     Specification of Letters Patent.     Patented Dec. 5, 1905.

Application filed March 20, 1905. Serial No. 251,156.

*To all whom it may concern:*

Be it known that I, JUDSON R. JONES, a citizen of the United States, residing at Rockton, in the county of Winnebago and State of Illinois, have invented certain new and useful Improvements in Wheeled Plows, of which the following is a specification.

The object of this invention is to provide a high lift for plows.

Figure 1:
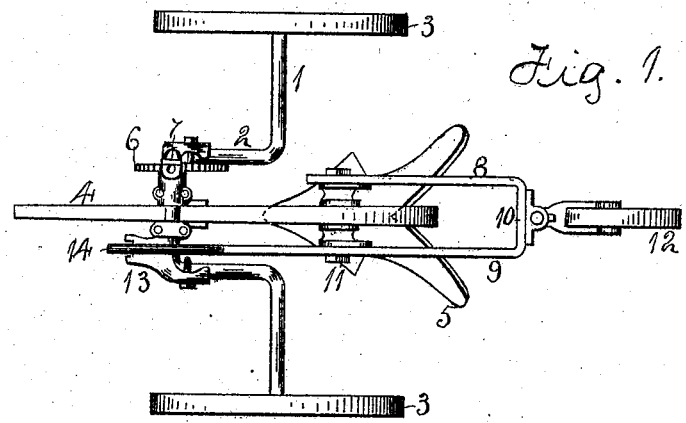
Figure 2:
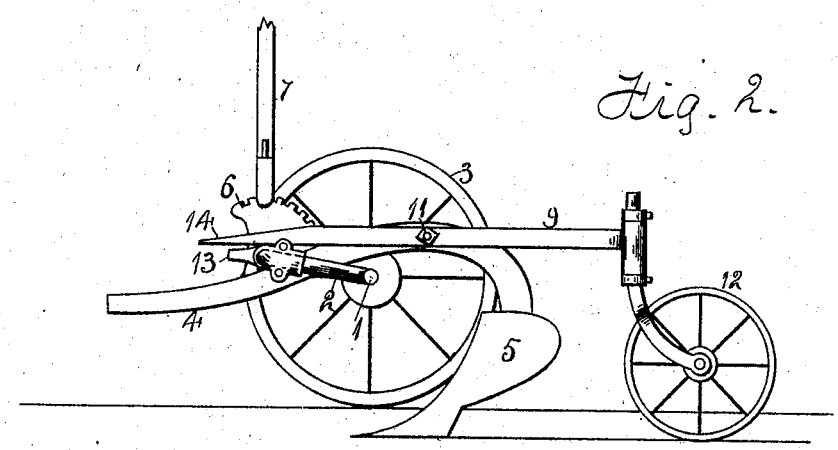
Figure 3:
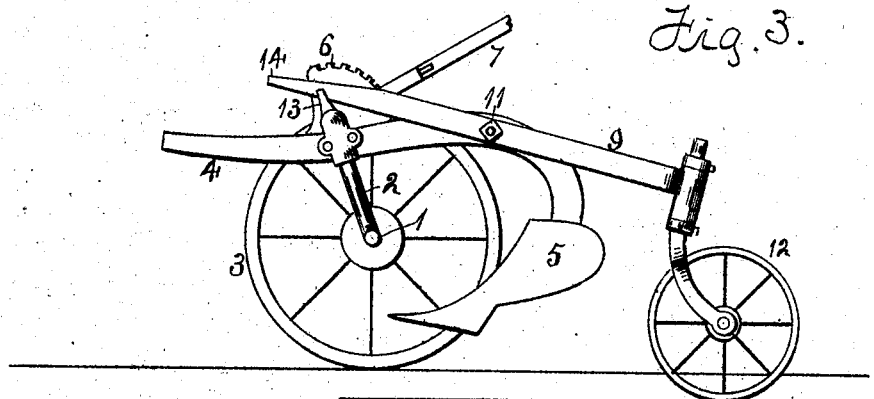

In the accompanying drawings, Figure 1 is a plan view of my improved wheeled plow. Fig. 2 is a side elevation with one of the carrying-wheels removed and the plow in working position. Fig. 3 is a similar side elevation with the plow elevated.

The axle 1 has its center portion 2 bent in bail form, and the axle proper is supported by two carrying-wheels 3.

A plow-beam 4 has a pivotal connection with the bail portion 2 of the axle and supports a plow 5. A toothed segment 6 has a fixed connection with the plow-beam, and a hand-lever 7 has a fixed connection with the bail portion of the axle.

A main frame comprising the side bars 8 and 9 and end bar 10 has a pivotal connection with the plow-beam at the point 11, and the end bar 10 has a caster-wheel 12 connected to it.

To the bail portion of the axle is secured an arm 13, which extends beyond the bail portion and is located beneath the forward extension 14 of the side bar 9 of the main frame.

In raising the plow by means of the hand-lever the axle is moved in its wheeled support, which will raise the bail portion and bring the arm 13 in contact with the under face of the extension 14 of the side bar 9 of the main frame, thereby raising the plow from the position shown in Fig. 2 to that shown in Fig. 3.

The supporting-wheels, in conjunction with the caster-wheel, serve to support the main frame and plow.

I claim as my invention—

1. In a wheeled plow, the combination of a plow-beam, a main frame composed of two side bars, a caster-wheel supported by the rear end of the main frame, the plow-beam located between the side bars of the main frame and pivotally connected therewith, an axle supported by carrying-wheels and having a section in bail form, a pivotal connection between the bail portion of the axle and the plow-beam, and an engagement between the main frame and the bail-section of the axle.

2. In a wheeled plow, the combination of a main frame, a plow-beam having a pivotal connection with the main frame, an axle supported by carrying-wheels and having a section in bail form, a pivotal connection between the bail-section of the axle and the plow-beam, a rear wheel supported by the main frame, the main frame extending forward of its pivotal connection with the plow-beam and raised and lowered by the rocking movement of the axle.

3. In a wheeled plow, the combination of a main frame, a plow-beam having a pivotal connection with the main frame, an axle supported by carrying-wheels and having a section in bail form, a pivotal connection between the bail-section of the axle and the plow-beam, the main frame extending forward of its pivotal connection with the plow-beam, a projection extending from the bail-section and adapted to engage the forwardly-extending portion of the main frame.

4. In a wheeled plow, the combination of a main frame, a plow-beam having a pivotal connection with the main frame, an axle supported by carrying-wheels and having a section in bail form, an arm extending from the bail portion, the bail portion having a pivotal connection with the plow-beam, and an extension of the main frame overlying the arm.

5. In a wheeled plow, the combination of a main frame, a plow-beam having a pivotal connection with the main frame, an axle supported by carrying-wheels and having a section in bail form, an arm extending from the bail-section, the bail-section having a pivotal connection with the plow-beam, an extension of the main frame overlying the arm, a toothed segment permanently attached to the plow-beam, and a hand-lever permanently connected to the bail-section and provided with a dog engagement with the toothed segment.

JUDSON R. JONES.

Witnesses:
   PEARLE HERRINGTON,
   HENRY J. MUCHOW.